US008068924B2

(12) United States Patent
Nagaoka et al.

(10) Patent No.: US 8,068,924 B2
(45) Date of Patent: Nov. 29, 2011

(54) COORDINATIVE CONTROL METHOD FOR ADJUSTING THE BACK AND KNEE BOTTOM SECTIONS OF AN ADJUSTABLE BED, AND COMPUTER PROGRAM FOR IMPLEMENTING SAME

(75) Inventors: Hiroshi Nagaoka, Tokyo (JP); Masao Horitani, Tokyo (JP); Satoru Inoue, Tokyo (JP)

(73) Assignee: Paramount Bed Company, Ltd., Tokyo (JP)

(*) Notice: Subject to any disclaimer, the term of this patent is extended or adjusted under 35 U.S.C. 154(b) by 584 days.

(21) Appl. No.: 12/253,145

(22) Filed: Oct. 16, 2008

(65) Prior Publication Data

US 2010/0125953 A1 May 27, 2010

Related U.S. Application Data

(63) Continuation-in-part of application No. 11/136,153, filed on May 24, 2005, now abandoned, and a continuation-in-part of application No. 10/389,960, filed on Mar. 18, 2003, now abandoned.

(30) Foreign Application Priority Data

Mar. 18, 2002 (JP) ................................ 2002-075074

(51) Int. Cl.
*G05B 11/32* (2006.01)
*G05B 19/18* (2006.01)
*A61G 7/018* (2006.01)

(52) U.S. Cl. ......... 700/70; 700/69; 700/302; 318/568.1; 5/618

(58) Field of Classification Search .................... 700/62, 700/64, 67, 69, 70, 83, 302; 318/466, 467, 318/489, 568.1; 5/613, 616, 617, 618, 619
See application file for complete search history.

(56) References Cited

U.S. PATENT DOCUMENTS

| | | | | |
|---|---|---|---|---|
| 5,715,548 | A * | 2/1998 | Weismiller et al. | 5/624 |
| 6,336,235 | B1 * | 1/2002 | Ruehl | 5/610 |
| 6,460,209 | B1 * | 10/2002 | Reeder et al. | 5/690 |
| 6,715,784 | B2 * | 4/2004 | Koerlin et al. | 280/650 |
| 6,854,141 | B2 * | 2/2005 | Nagaoka et al. | 5/618 |
| 6,870,341 | B2 * | 3/2005 | Nagaoka et al. | 318/475 |
| 6,976,699 | B2 * | 12/2005 | Koerlin | 280/650 |
| 7,058,999 | B2 * | 6/2006 | Horitani et al. | 5/618 |

* cited by examiner

*Primary Examiner* — Michael Safavi
(74) *Attorney, Agent, or Firm* — Townsend & Banta

(57) ABSTRACT

A coordinative control method for adjusting the back and knee bottom sections of an adjustable bed or the like, and a computer program for implementing the method, are provided. Specifically, a method for adjusting the back and knee bottom section is provided, in which the angular positions thereof are adjusted according to a preset action pattern. The initial starting positions of the adjustable sections are taken into account, and adjusted to a position corresponding to the closest point on a curve representing angular movement of the sections during the adjustment process. Then, the sections are adjusted in a manner that prevents exertion of uncomfortable pressure upon the torso of a user, and prevents sliding of a user relative to the foot of the bed.

23 Claims, 9 Drawing Sheets

COORDINATIVE CONTROL METHOD FOR ADJUSTING THE BACK AND KNEE BOTTOM SECTIONS OF AN ADJUSTABLE BED, AND COMPUTER PROGRAM FOR IMPLEMENTING SAME

This is a Continuation-In-Part (CIP) application of application Ser. No. 11/136,153, filed May 24, 2005, itself a CIP of application Ser. No. 10/389,960, filed Mar. 18, 2003.

FIELD OF THE INVENTION

The present invention relates to a coordinative control method for controlling the lifting of the back and knee bottom sections of an adjustable bed or the like, and a computer program for implementing the lifting process of the adjustable bed. In particular, a method, and computer program for implementing same, is provided for controlling the back and knee lifting functions of an adjustable bed, for adapting the present positions of the bottom sections of the adjustable bed to a desired final position based on a present action pattern, wherein the back and knee bottom sections operate in such a manner so as to prevent discomfort to and sliding of the user relative to the bed during lifting.

BACKGROUND OF THE INVENTION

In recent years, many adjustable medical beds and general (long term care) beds have been available, allowing positional adjustment of the bottom sections thereof (i.e., angular/inclination adjustment of the adjustable bottom sections, so as to lift the back and knees) have been commercially available. Such beds have included versions designed to allow a user to lift and lower the back lifting portion (i.e., the adjustable section of the bed supporting the back) and the knee lifting portion (i.e., the adjustable section of the bed supporting the legs/knees), based on various action patterns. However, when the positions of bottom sections of such conventional beds are adjusted, the adjustment process is not always begun from the initial state, i.e., the state in which the sections of the bed are positioned so as to lie flat.

Actually, often, users start the adjustment process from a state wherein the back bottom section and the knee bottom section of the adjustable bed are already at an elevated position. Therefore, when conventional computer-controlled adjustable beds are adjusted according to a predetermined action pattern, starting from an already adjusted position (i.e., inclined position), it is necessary to first quickly adapt the positions of the bed sections to the action pattern.

U.S. Pat. No. 6,460,209 discloses a control means provided as a storing means for storing preferred positions of the back bottom member and knee bottom member, so that the back and knee bottom members can be controlled to travel to the positions stored in the storing means. However, in the '209 patent, the storing means only stores data concerning the final positions at which the back bottom member and the knee bottom member are inclined after having been controlled by the control means. The continuous positions and path (i.e, the intermediate positions) which the back bottom member and the knee bottom member are to pass before they reach the final positions are not stored in the control means.

Such conventional curves are illustrated in FIGS. 11 and 12, together with the path of travel, when the controller directs movement of the back bottom members to a desired final position. It has been found that when raising and lowering adjustable bed sections in conventional adjustable beds, users are frequently subjected to discomfort from pressure exerted on their abdominal sections, and slide relative to the bed during the movement process, all of which are undesirable in hospital and treatment settings. For example, patients that are recovering from abdominal surgery can be put at great risk of injury and pain if the adjustable bed upon which they are placed is adjusted in an improper manner that exerts harmful pressure upon their incision, operable area, etc.

Accordingly, it is an object of the present invention to solve these problems by providing a coordinative control method for the back and knee bottom sections of a bed or the like having back lifting and knee lifting functions, and computer program for implementing same. In particular, it is an object of the present invention to provide a method, and computer program for implementing same, operable to coordinatively raise and lower the back and knee bottom sections of an adjustable bed according to a predetermined action (preset action pattern) from any arbitrary position.

SUMMARY OF THE INVENTION

To solve the above-mentioned problem, the present invention provides a method of coordinatively controlling the raising and lowering of the back and knee bottom sections of an adjustable bed or the like, and a computer program product implementing same. In particular, the present invention provides "preset action patterns", which define method steps to coordinatively control the angular adjustment of the knee and back bottom sections of an adjustable bed during angular adjustment to a predetermined angular position, and a method of efficiently conforming the initial angular position of the adjustable sections to an angular position in conformance with the chosen preset action pattern. Irrespective of the present state of positions of the bottom sections, a desired adjusted state can be achieved.

The method and computer program of the present invention can be utilized with various conventional adjustable beds. For example, the adjustable bed may include, for example, hospital beds, stretchers, ICU beds or long term care beds. The method of the present invention, and computer program implementing same, raise and/or lower the back bottom section and the knee bottom section of the adjustable bed or the like according to a chosen preset action pattern. The raising and lowering processes according to the preset action patterns are conducted, while taking into consideration the present state of position of the back bottom and knee bottom sections, so as to prevent sliding of the user relative to the bed, or discomfort of the user caused by exertion of pressure on the abdominal section thereof.

The correlation between the coordinated raising and lowering of the back bottom section and the knee bottom sections of the adjustable bed is expressed as a correlative action curve on a two-dimensional space, in which the inclination angle of the back bottom member is chosen as one axis, while the inclination angle of the knee bottom member is chosen as the other axis perpendicular to said one axis, as shown in FIGS. 9 and 10. Specifically, the back bottom sections and the knee bottom sections of the adjustable bed are lifted and lowered in a coordinative manner so as to conform to the correlative action curve.

The method and computer program of the present invention enable the positions of the back bottom and knee bottom sections of the adjustable bed to be quickly adjusted to conform to the correlative action curve, as shown in FIG. 10. That is, in the present invention, the back bottom sections and the knee bottom sections are lifted and lowered in a coordinated manner, according to a predetermined (preset) action pattern found to provide users of the adjustable bed with stability and comfort during the adjustment process, so as adjust the sections of the adjustable bed to the intended final inclination positions.

Importantly, the predetermined intermediate positions of the back bottom section and the knee bottom sections (i.e., the positions of the adjustable bed sections during the adjustment process) for each preset action pattern correlating to a plurality of predetermined final positions are stored in the data storage means of a control means. These predetermined intermediate positions are illustrated and correspond to positions on the correlative action curve for each preset action pattern, as illustrated in FIG. 10.

Furthermore, the present invention provides a method and computer program implementing same to raise and lower the back and knee bottom sections of an adjustable bed or the like according to a preset action pattern, wherein the back bottom section and the knee bottom section are raised and lowered in a coordinative manner. In particular, the method and computer program implementing same take into consideration the starting positions of the bottom of the bed or the like, such that the knee bottom section is adjusted to an angle corresponding to a predetermined back lifting angle required by the chosen preset action pattern, thereby adapting the starting position of the knee bottom section to a position called for by the action pattern.

The present invention further provides a method and computer program implementing same to raise and lower the back and knee bottom sections of an adjustable bed or the like in a coordinated manner according to a preset action pattern, wherein, at the beginning of the raising and/or lowering process, the back bottom section and the knee bottom section are adjusted to the nearest action change point of the knee bottom section according to the chosen preset action pattern, in order to enable the bottom sections to be adjusted based on said action pattern without having to return to an initial (start) position called for by the preset action patter.

In another aspect of the present invention, the back bottom section and the knee bottom section can be quickly brought to the positions corresponding to a predetermined action pattern, and the bottom sections can be adjusted to desired positions according to the action pattern. Accordingly, a simplified position control map can be used.

DETAILED DESCRIPTION OF THE PREFERRED EMBODIMENTS

Figure 1:
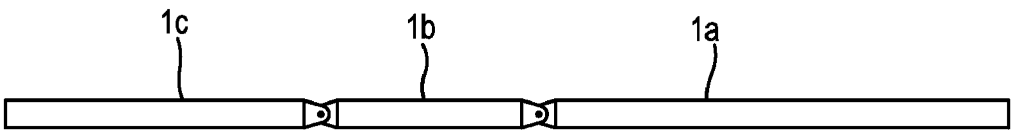
FIG. 1 is a partial side view of an adjustable long term care bed to which the coordinative control method and computer program for carrying out the method of the present invention is applied, illustrating the adjustable sections thereof.

As illustrated in FIG. 1, the bottom of an adjustable bed is divided into a back bottom section 1*a* corresponding to the back, a knee bottom section 1*b* corresponding to the region from the waist to the knees, and the leg bottom section 1*c* corresponding to the legs. Further, although not illustrated, a back lifting link as a back lifting mechanism abuts the back side of said back bottom section 1*a*, while a knee lifting link as a knee lifting mechanism is attached to the back side of the knee bottom section 1*b* for lifting and lowering the knee bottom section 1*b* and the leg bottom section 1*c* in a coordinative manner. The back lifting link and the knee lifting link are respectively connected to drive means (not illustrated), each of which actuates the back lifting link and knee lifting link.

The types of drive means are not limited. However, for example, a direct electrical drive mechanism (i.e., an electric motor), a pneumatic drive mechanism, or a hydraulic drive mechanism (all of which are not illustrated) may be utilized. Remote control switches or control switches (not illustrated) are generally provided on a control panel (i.e., on or in communication with a controller), and are in communication with the drive means, enabling a user, an attendant, nurse or the like to input control commands for back lifting, knee lifting and gatch action (concurrent back lifting and knee lifting), according to preset action patterns, such that electric power is supplied from a controller mounted on a control box installed at a frame or the like of the bed, to start the respective directly acting drive mechanisms, thereby adjusting the adjustable sections of the bed to the desired positions. The drive motors are in communication with rotation quantity detecting means, acting as means for detecting the position of the back bottom section 1*a* and the knee bottom section 1*b*, and transmitting data concerning same.

The controller, in communication with the control panel and drive means, includes a processor capable of running the computer program of the present invention, so as to execute the method called for herein. The processor may be any conventional microprocessor, such as a Pentium® processor, but relatively little computing power is needed. Therefore, an inexpensive, low level microprocessor may be used.

The processor further has inputs and outputs to receive and transmit data (from, for example, rotation (angular) detection means which detect the angular position of the back bottom section and knee bottom section of the adjustable bed), and is in communication with a data storage (memory) means. The memory may be any computer readable medium, including but not limited to RAM, ROM, Flash ROM, EEP ROM, a storage diskette, compact disc, hard drive, chip drive, tape, MEMORY STICK®, or any other type of volatile or non-volatile memory.

The memory is operable to store one or more data structures, referred to as "preset action patterns", as called for by the present invention, which comprise a set of predetermined angular movements of the knee and back bottom sections of the bed required when adjusting the sections to a chosen angular position. These "preset action patterns" embody software that may be stored in memory for later retrieval and access by the processor, such that the computer program of the present invention may execute the method called for by the preset action patterns. The computer software program of the present invention can be implemented using a variety of high or low-level programming languages including but not limited to assembly, C, C++, Fortran or the like.

Figure 2:
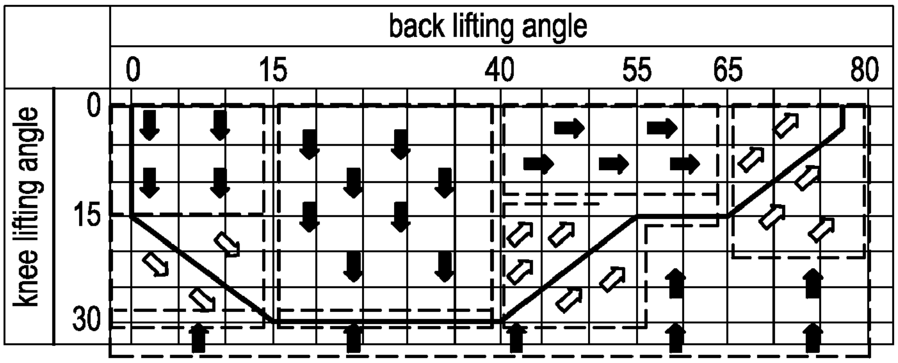
FIG. 2 is a position control map illustrating the coordinated angles of adjustment for the back and knee bottom sections of an adjustable bed employed by the method and computer program of the present invention during execution of the preset action pattern of the present invention.
Figure 9:
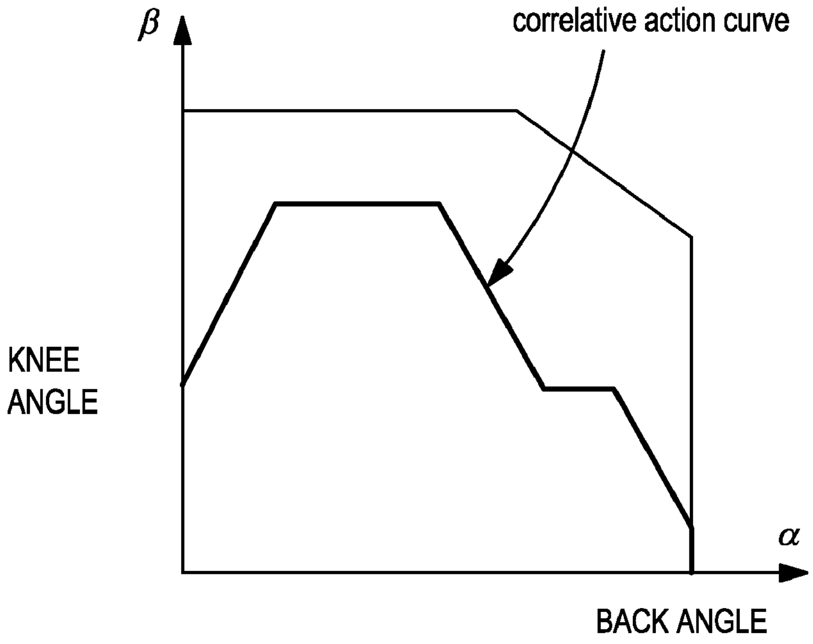
FIG. 9 is a correlative action curve showing the angles of the knee section and back bottom section of an adjustable bed throughout a coordinated lifting and lowering process according to a preset action pattern of the present invention.

At the direction of commands issued by the computer program of the present invention executing a preset action pattern stored in the memory means, the controller starts and stops the supply of electric power to the directly acting drive mechanisms, thereby actuating the back lifting mechanism and the knee lifting mechanism based on signals received from said remote control switches or the control switches of the control panel. For example, the thick solid line in FIG. 2 illustrates a back lifting action control procedure of a representative preset action pattern. The "corrective action curve" shown in FIG. 9 illustrates an example of the angles at which the knee and back sections of the adjustable bed are moved during the adjustment process carried out according to a chosen preset action pattern according to the present invention.

As illustrated in FIG. 2, control commands are transmitted by the controller to the drive means, at the direction of the computer program executing a preset action pattern according to the method of the present invention, to carry out a back lifting action procedure as follows:

(i) Lifting of the knee section is started (i.e., the knee lifting motor is turned on for normal rotation), (ii) Lifting of the back section is started (i.e., the back lifting motor is turned on for normal rotation) after lapse of time t (i.e., the time at which the knee section is lifted to an angle of 15 degrees), (iii) Lifting of the knee section is halted (i.e., the knee lifting motor is turned off) after lapse of predetermined time (T), at which point the knee section is lifted to an angle of 30 degrees and the back section is lifted to an angle 15 degrees, (iv) Lifting of the back section is then continued until the back section reaches an angle of 40 degrees, (v) The knee section is then lowered until reaching an angle of 15 degrees (i.e., the knee lifting motor is turned on for reverse rotation), and lifting of the back section is continued until the back section reaches an angle of 55 degrees, (vi) Lifting of the back section is then continued until the back section reaches an angle of 65 degrees, (vii) The knee section is then lowered until the knee section reaches an angle of about 3 degrees, and lifting of the back section is continued until the back section reaches an angle of about 78 degrees, and (viii) Lifting of the back section is halted (i.e., the back lifting motor is turned off), and lowering of the knee section continues and is halted at an angle of 0 degrees (ie., is flat) and the knee lifting motor is turned off.

For example, in a first preferred embodiment of the present invention, a computer program embodied on a computer readable medium for coordinatively controlling back and knee bottom sections of an adjustable bed during movement thereof according to a preset action pattern for lifting and lowering of the bed, so as to prevent a person lying in the bed from experiencing abdominal pressure as their legs approach their upper body during the movement, is provided. This computer program comprises computer executable instructions for implementing said preset action pattern comprising:

(a) executable instructions for detecting present starting inclination angles of the back and knee bottom sections of the adjustable bed, thereby identifying the present starting inclination angles thereof;

(b) executable instructions for comparing identified present starting inclination angles of the back and knee bottom sections with predetermined inclination angles required by the preset action pattern;

(c) executable instructions for calculating (from step (b) above) a position on the back bottom section and knee bottom section according to the preset action pattern nearest to the detected present starting inclination angles of the back and knee bottom sections;

(d) executable instructions for raising and/or lowering the back and knee bottom sections so as to shift their starting inclination angles to predetermined inclination angles of nearest back and knee bottom section positions in the preset action pattern, for adapting a present coordinate position of the back and knee bottom sections to a starting coordinate position required by the preset action pattern; and (e) executable instructions for raising and/or lowering the back and knee bottom sections according to said preset action pattern, so as to adjust the adjustable sections of the bed to a predetermined final resting position.

In a second preferred embodiment of the computer program of the present invention, computer executable instructions are provided for implementing said preset action pattern comprising:

(a) executable instructions for detecting present starting (initial) inclination angles of the back and knee bottom sections, so as to identify present starting inclination angles thereof;

(b) executable instructions for comparing identified present starting (initial) inclination angles of the back and knee bottom sections with predetermined inclination angles required by the preset action pattern;

(c) executable instructions for calculating from step (b) above an angular position of the knee bottom section of the preset action pattern nearest to the detected present starting (initial) inclination angle of the knee bottom section;

(d) executable instructions for raising and/or lowering the knee bottom section from a starting (initial) inclination angle to an inclination angle corresponding to a nearest calculated position from step (c) above of the back bottom section in the preset action pattern; and (e) executable instructions for raising and/or lowering the back and knee bottom sections to conform to said preset action pattern, so as to adjust the position of the adjustable sections of the bed to a predetermined final resting position.

In a third preferred embodiment of the computer program of the present invention, computer executable instructions are provided for implementing a preset action pattern comprising:

(a) executable instructions for detecting present starting (initial) inclination angles of the back and knee bottom sections, so as to identify their present starting inclination angles;

(b) executable instructions for comparing the identified present starting (initial) inclination angles of the back and knee bottom sections with predetermined inclination angles required by the preset action pattern;

(c) executable instructions for calculating (from step (b) above) a position of an action turning point of a back bottom section on a preset action pattern nearest to the detected present starting (initial) inclination angle of the knee bottom section;

(d) executable instructions for raising and/or lowering the back and knee bottom sections so that the identified present starting (initial) inclination angles of the back and knee bottom sections are adjusted to the calculated nearest action turning point of a knee bottom section in the preset action pattern from step (c); and (e) executable instructions for raising and/or lowering both the back and knee bottom sections according to said preset action pattern, so as adjust the angular positions of the adjustable sections of the bed to a predetermined final resting position.

For carrying out the above-mentioned back lifting action procedures, as illustrated in FIGS. 2, 8, 13 and 14, said controller receives signals (data), indicating the location (angle) of the adjustable sections of the bed, from the rotation quantity detecting means in communication with the drive motors. This data provides information to the controller (processor) regarding the angular position of the back bottom section 1*a* and the knee bottom section 1*b* at the time of starting (i.e., before adjustment of the bed begins). In response to the received position information pertaining to the initial positions of the bottom sections of the adjustable bed before the lifting procedure has begun, according to the method of the present invention, commands are transmitted by the controller at the direction of the computer program to adjust the adjustable sections of the bed to the closest angle on the correlative action curve according to the preset action pattern.

Figure 12:
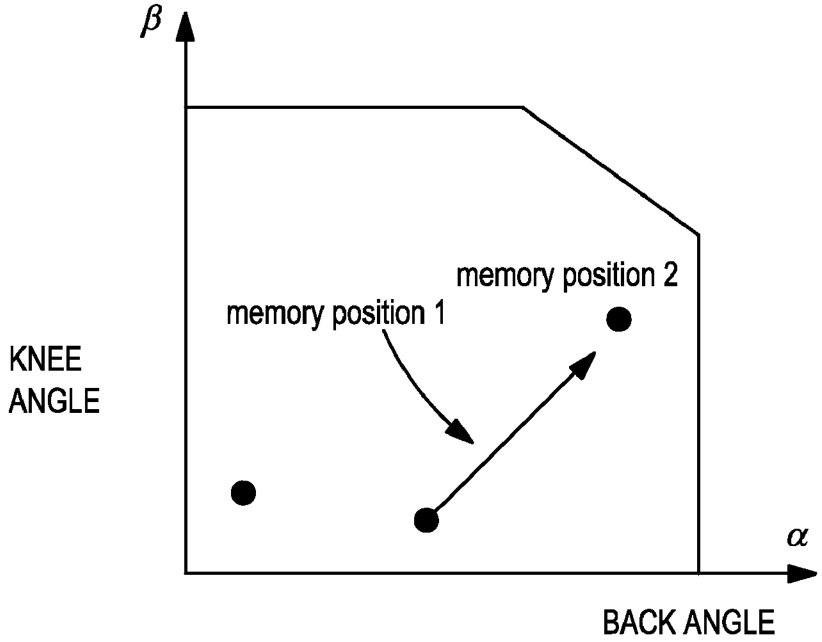
PRIOR ART FIGURE 12
FIG. 12 is a graph illustrating the adjustment path of bottom members of an adjustable bed carried out by the prior art methods when only the final positions of the back and knee bottom members are stored in a control means.
Figure 13:
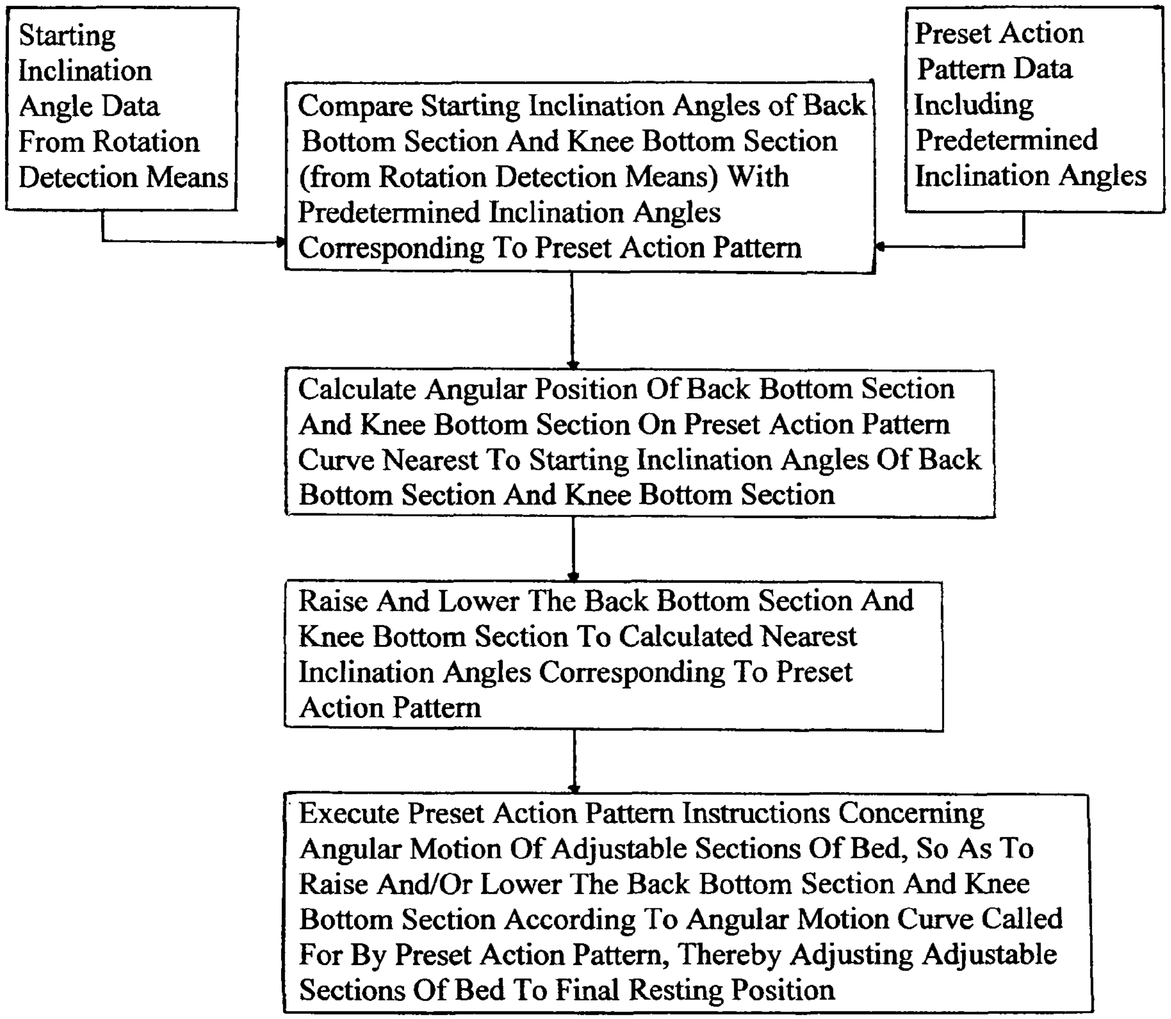
FIG. 13 is a flow chart illustrating the steps undertaken by one embodiment of the computer program of the present invention.

In particular, as illustrated in FIGS. 12 and 13, the knee lifting motor and/or the back lifting motor is actuated by the controller, based on instructions (commands) issued by the computer program, so as to initially adjust the angle of the knee and/or back sections of the adjustable bed to the aforesaid action pattern. However, this initial adjustment takes into account both the initial positions of the adjustable sections of the bed, and the relation thereof to the angular positions of the sections as called for by the preset action pattern. Importantly, this initial adjustment is based on numerous rules as follows:

(1) If the initial angle of the knee section of the bed is 0 to 15 degrees, and the initial angle of the back section is 0 to 15 degrees, then the knee section is lifted (i.e., the knee lifting motor is turned on for normal rotation).

(2) If the initial angle of the knee section of the bed is 15 to 30 degrees, the initial angle of the back section of the bed is 0 to 15 degrees, and the initial angle of the back section is required to be larger than the initial angle of the knee section according to the preset action pattern, then the knee section is lifted (i.e., the knee lifting motor is turned on for normal rotation).

(3) If the initial angle of the knee section of the bed is 15 to 30 degrees, the initial angle of the back section is 0 to 15 degrees, and the initial angle of the back section is required to be smaller than the initial angle of the knee section according to the preset action pattern, then the back section is lift (i.e., the back lifting motor is turned on for normal rotation).

(4) If the initial angle of the knee section of the bed is 0 to 30 degrees, and the initial angle of the back section is 15 to 40 degrees, then the knee section is lifted (i.e., the knee lifting motor is turned on for normal rotation).

(5) If the initial angle of the knee section of the bed is 0 to 15 degrees, and the initial angle of the back section of the bed is 40 to 65 degrees, then the back section is lifted (i.e., the back lifting motor is turned on for normal rotation).

(6) If the initial angle of the knee section of the bed is 15 to 30 degrees, the initial angle of the back section of the bed is 40 to 55 degrees, and the initial angle of the back section of the bed is required to be smaller than the initial angle of the knee section of the bed according to the preset action pattern, then the back section is lifted (i.e., the back lifting motor is turned on for normal rotation).

(7) If the initial angle of the knee section of the bed is 15 to 30 degrees, the initial angle of the back section of the bed is 40 to 55 degrees, and the initial angle of the back section of the bed is required to be larger than the knee section of the bed according to the preset action pattern, then the knee section is lowered (i.e., the knee lifting motor is turned on for reverse rotation).

(8) If the initial angle of the knee section is 15 to 30 degrees, and the initial angle of the back section is 55 to 78 degrees, then the knee section is lowered (i.e., the knee lifting motor is turned on for reverse rotation).

(9) If the initial angle of the knee section is 0 to 20 degrees, the initial angle of the back section is 65 to 78 degrees, and the initial angle of the back section is required to be larger than the knee section according to the preset action pattern, then the back section is lifted (i.e., the back lifting motor is turned on for normal rotation).

(10) If the initial angle of the knee section is 0 to 20 degrees, the initial angle of the back section is 65 to 78 degrees, and the initial angle of the back section is required to be smaller than the initial angle of the knee section according to the preset action pattern, then the knee section is lowered (i.e., the knee lifting motor is turned on for reverse rotation).

In the above-mentioned coordinative control method for adjusting the back and knee bottom sections of an adjustable bed or the like according to the present invention, the action is described below based on the setting procedure.

In the method of the present invention, initially, the knee bottom section is lifted so as to prevent a person lying in the adjustable bed from sliding toward the foot of the bed as the back bottom section of the bed is elevated. However, as the knees and back of a person are raised, the person may feel discomfort caused by the pressure exerted on their torso as their knees approach their upper body. Since uncomfortable pressure occurs at different angles of the knee section, depending upon the person, the angle of the knee section is preset using a remote control switch or a knee lifting angle setting switch on the control panel.

The maximum knee lifting angle, as illustrated in FIGS. 2, 8, 9 and 10, corresponds to the point at which a person in the bed may feel uncomfortable pressure as their knees are lifted when their body is being elevated. For example, when receiving a command to begin lifting the back section of the bed, the controller receives and analyzes the position data transmitted by the rotation detection means in communication with the drive motors. This data indicates the initial position of the back bottom section 1*a* and the knee bottom section 1*b*. Then, the adjustable sections of the bed are first adjusted according to the adaptation procedures described in (1) through (10) above, and the back section is lifted according to the action pattern of (i) through (viii).

Figure 14:
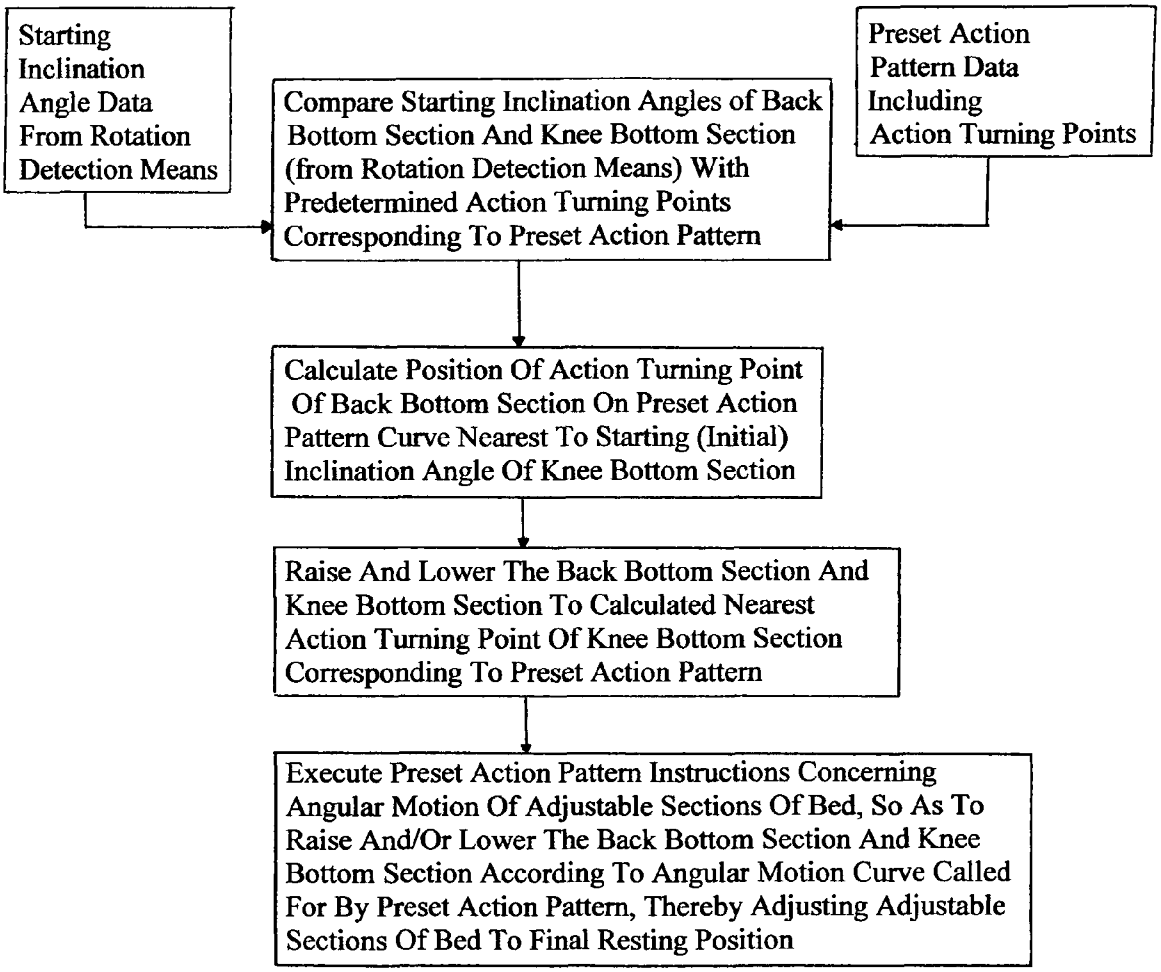
FIG. 14 is a flow chart illustrating the steps undertaken by another embodiment of the computer program of the present invention.

With regards to the rotation quantity detecting means, any conventional position detecting means can be used to determine and detect the position information of the back and knee bottom sections. For example, a mechanical, optical, or magnetic means may be utilized. Upon receiving position information from the position detecting means, as illustrated in FIGS. 13 and 14, the controller then compares the present position (angle) of the back and knee bottom sections of the bed to positions (angles) called for by the chosen preset correlative position control pattern (preset action pattern). Then, if the present (initial) position of the deviates from the preset control pattern, the controller can then issue commands executable to adjust the back and knee bottom sections to the nearest action conversion point of the knee bottom section action pattern.

Figure 3:
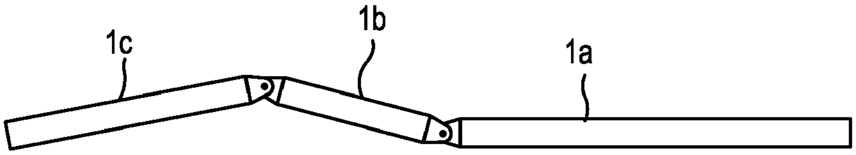
FIG. 3 is a partial side view of adjustable sections of an adjustable bed, illustrating the positions of various sections of the bed during the process of lifting the knee section.
Figure 4:
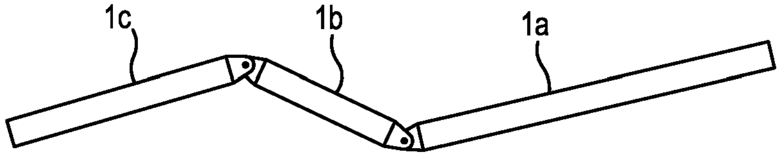
FIG. 4 is a partial side view of the adjustable sections of the adjustable bed shown in FIG. 3, illustrating the positions of the adjustable sections further in the preset action pattern process, wherein the back section has begun being lifted together with the knee section.

If the position information indicates that the initial position of the bottom 1 is in a flat state, as illustrated in FIG. 1, the controller can carry out back lifting according to the action pattern of (i) through (viii) without carrying out any adaptation procedure. However, if the position information indicates that the initial position of the bottom is in an inclined state, as illustrated in FIG. 3 or 4, and (1) if the initial angle of the knee section of the bed is 0 to 15 degrees, and the initial angle of the back section is 0 to 15 degrees, then the knee section is lifted (i.e., the knee lifting motor is turned on for normal rotation), (2) if the initial angle of the knee section of the bed is 15 to 30 degrees, the initial angle of the back section of the bed is 0 to 15 degrees, and the initial angle of the back section is required to be larger than the initial angle of the knee section according to the preset action pattern, then the knee section is lifted (i.e., the knee lifting motor is turned on for normal rotation) or (3) if the initial angle of the knee section of the bed is 15 to 30 degrees, the initial angle of the back section is 0 to 15 degrees, and the initial angle of the back section is required to be smaller than the initial angle of the knee section according to the preset action pattern, then the back section is lifted (i.e., the back lifting motor is turned on for normal rotation), so as to adjust position of the knee and back sections to the initial angle called for by the chosen preset action pattern. Subsequently, lifting of the back section is carried out according to the action pattern of (ii) through (viii).

Figure 5:
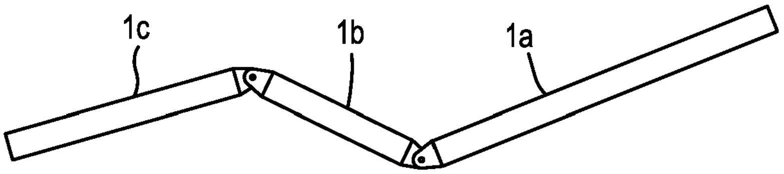
FIG. 5 is a partial side view of the adjustable sections of the adjustable bed shown in FIGS. 3 and 4, illustrating the positions of the sections after lifting of the knee section has ceased, and the back section has been further raised.

Furthermore, if the position information indicates that the initial position of the bottom 1 is in an inclined state, as shown in FIG. 5, and (4) if the initial angle of the knee section of the bed is 0 to 30 degrees, and the initial angle of the back section is 15 to 40 degrees, then the knee section is lifted (i.e., the knee lifting motor is turned on for normal rotation) so as to adjust the position of the knee and back section to the initial angle called for by the chosen preset action pattern. Subsequently, lifting of the back section is carried out according to the action pattern of (iv) through (viii).

Figure 6:
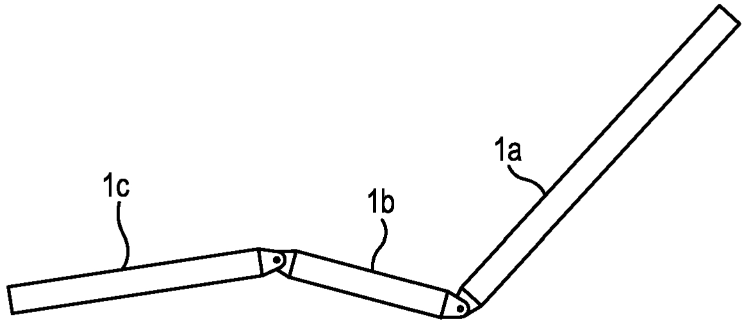
FIG. 6 is a partial side view of the adjustable sections of the adjustable bed shown in FIGS. 3-5, illustrating the positions of the sections after continuation of lifting of the back section has taken place.

Still furthermore, if the position information indicates that that the initial position of the bottom 1 is in an inclined state, as illustrated in FIG. 6, and (5) if the initial angle of the knee section of the bed is 0 to 15 degrees, and the initial angle of the back section of the bed is 40 to 65 degrees, then the back section is lifted (i.e., the back lifting motor is turned on for normal rotation), so as to adjust the position of the knee and back sections to the initial angle called for by the chosen preset action pattern. Subsequently, lifting and lowering actions are carried out according to the present invention, i.e., lowering of the knee section is carried out until the knee section is at an angle of about 0 degree, the back section is lifted until it reaches an angle about 78 degrees, and then both the back lifting motor and knee lifting motor are turned off by the controller.

Still further, (6) if the initial angle of the knee section of the bed is 15 to 30 degrees, the initial angle of the back section of the bed is 40 to 55 degrees, and the initial angle of the back section of the bed is required to be smaller than the initial angle of the knee section of the bed according to the preset action pattern, then the back section is lifted (i.e., the back lifting motor is turned on for normal rotation), or (7) if the initial angle of the knee section of the bed is 15 to 30 degrees, the initial angle of the back section of the bed is 40 to 55 degrees, and the initial angle of the back section of the bed is required to be larger than the knee section of the bed according to the preset action pattern, then the knee section is lowered (i.e., the knee lifting motor is turned on for reverse rotation), and then lifting of the back section is carried out according to the preset action pattern of (v) through (viii).

Figure 7:
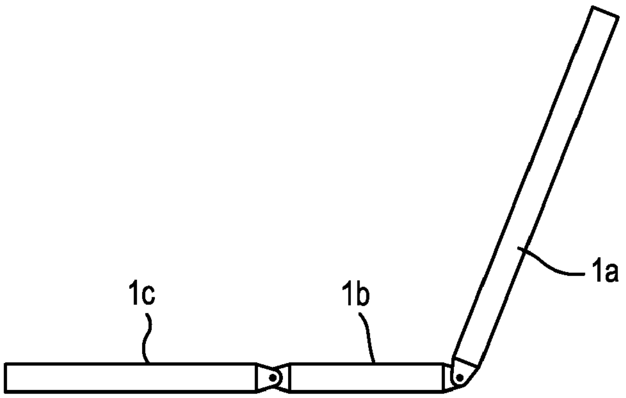
FIG. 7 is a partial side view of the adjustable sections of the adjustable bed shown in FIGS. 3-6, illustrating the positions of the adjustable sections of the bed at the completion of the lifting and lowering of the sections according to a preset action pattern of the present invention.

Furthermore, as shown in FIG. 7 and (8), if the initial angle of the knee section is 15 to 30 degrees, and the initial angle of the back section is 55 to 78 degrees, then the knee section is lowered (i.e., the knee lifting motor is turned on for reverse rotation), and (9) if the initial angle of the knee section is 0 to 20 degrees, the initial angle of the back section is 65 to 78 degrees, and the initial angle of the back section is required to be larger than the knee section according to the preset action pattern, then the back section is lifted (i.e., the back lifting motor is turned on for normal rotation), or (10) if the initial angle of the knee section is 0 to 20 degrees, the initial angle of the back section is 65 to 78 degrees, and the initial angle of the back section is required to be smaller than the initial angle of the knee section according to the preset action pattern, then the knee section is lowered (i.e., the knee lifting motor is turned on for reverse rotation), so as to adjust the knee and back sections of the bed to the initial angles called for by the chosen preset action pattern. Thereafter, lifting of the back section of the adjustable bed can be completed.

As described above, if any of the above-mentioned adaptation (adjustment) procedures applicable to each case is used, the back bottom section 1*a* and the knee bottom section 1*b* can be quickly brought to the angular positions required by the corresponding chosen preset action pattern. Thereafter, the bottom 1 is adjusted to a desired back lifting position (i.e., a final back section angle) according to the chosen preset action pattern.

Furthermore, in the present invention, in response to the detected initial position information of the bottom 1, the knee lifting motor and the back lifting motor are actuated in a controlled manner by the controller to adjust the adjustable bed sections to positions called for in the preset action pattern. In particular, the desired angle for each adjustable section of the bed is computed by the computer program of the present invention, and corresponding adjustment commands are issued by the computer program of the present invention running on a microprocesser within the controller. These adjustment commands are converted to, for example, electrical signals to power the drive means, and transmitted to the drive means (i.e., lifting motors), thereby adjusting the knee and back sections of the adjustable bed to angles corresponding to the chosen preset action pattern.

Figure 8:
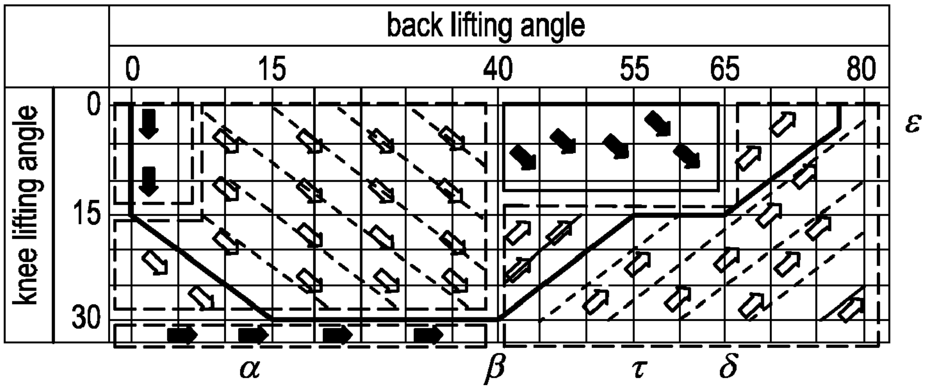
FIG. 8 is a position control map illustrating the coordinated angles of adjustment for the back and knee bottom sections of an adjustable bed employed by a preset action pattern of the present invention, in the coordinative control method for the back and knee bottom sections of a bed or the like of this invention.

That is, as shown in FIG. 8, based on the detected initial position information of the bottom 1, the back bottom section 1*a* and the knee bottom section 1*b* are adjusted so as to aim towards the nearest action conversion point (angle) of the knee bottom section 1*b* on the chosen preset action pattern.

Figure 10:
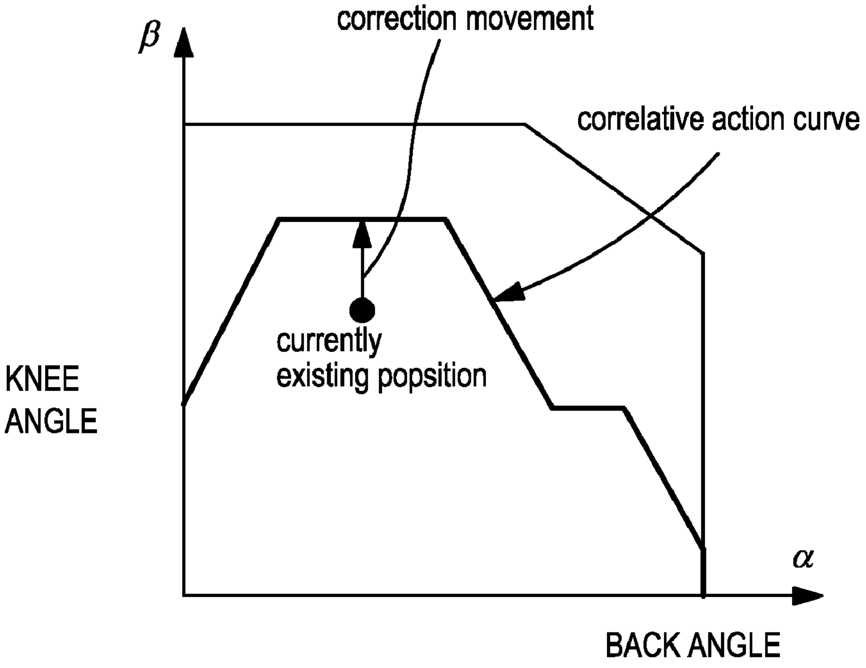
FIG. 10 is a correlative action curve showing angles of the knee section and back section of an adjustable bed throughout the coordinated lifting and lowering process according to a preset action pattern of the present invention, as well as the correction movement undertaken by the method and computer program of the present invention to adjust the back and knee bottom sections of a bed to the closest point on the action curve when the existing positions of the back and knee bottom sections at the start of the adjustment process do not correspond to the predetermined action curve.
Figure 11:
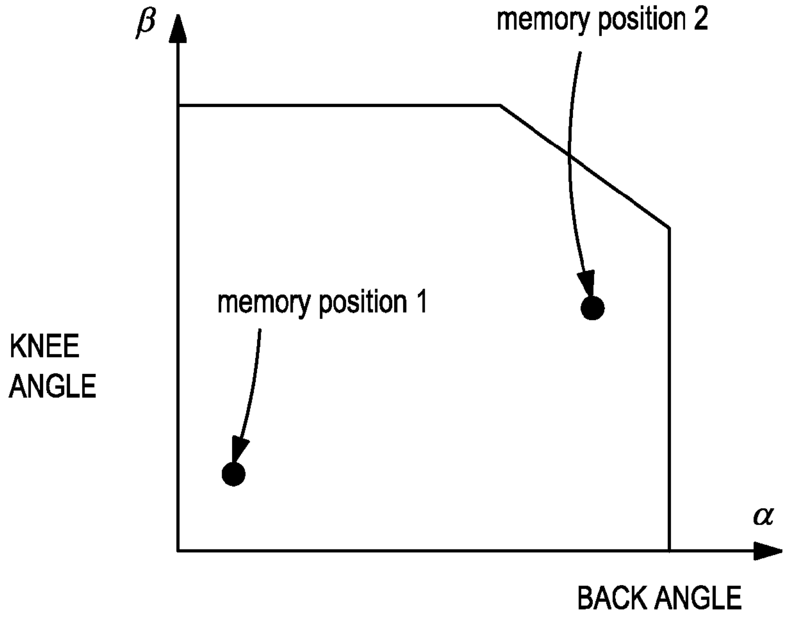
PRIOR ART FIGURE 11
FIG. 11 is a graph illustrating how the prior art stores desired positions of bottom members of a bed merely as a correlative point.

The term "action conversion point", as illustrated in FIG. 10, refers to a point on the preset correlative position control pattern (shown as the "corrective action curve" in FIG. 9) where the knee bottom section changes direction. The manner in which the knee lifting motor and back lifting motor are controlled to aim at the nearest action change point is described in greater detail hereinafter.

The controller is preset (by the user choosing a preset action pattern) to control the actuation of the knee lifting motor and the back lifting motor, to adjust the angle of the knee or back section of the bed so as to correspond the angles thereof to the aforesaid chosen preset action pattern as described above in response to the detected initial position information of the bottom sections. As described above, the initial adjustment decisions (actions) are made based on the initial positional data of the adjustable sections, the relation thereof to the preset action pattern, and the final resting position called for by the preset action pattern as follows:

(1) If the initial angle of the knee section is 15 to 30 degrees, the initial angle of the back section is 0 to 15 degrees, and the angle of the back section is smaller than that required by the chosen preset action pattern, then the knee lifting motor and the back lifting motor are actuated in a controlled manner by the controller so as to aim the angles thereof at the action change point α (knee lifting angle 30 degrees, back lifting angle 15 degrees).

(2) If the initial angle of the knee section is 0 to 30 degrees, the initial angle of the back section is 0 to 40 degrees, and the angle of the back section is larger than that required by the chosen preset action pattern, then the knee lifting motor and the back lifting motor are actuated in a controlled manner so as to aim the angles thereof at the action change point β (knee lifting angle 30 degrees, back lifting angle 40 degrees).

(3) If the initial angle of the knee section is 15 to 30 degrees, the initial angle of the back section is 40 to 55 degrees, and the back lifting angle is smaller than that required by the chosen preset action pattern, then the knee lifting motor and the back lifting motor are actuated in a controlled manner so as to aim the angles thereof at the action change point γ (knee lifting angle 30 degrees, back lifting angle 40 degrees).

(4) If the initial angle of the knee section is 0 to 15 degrees, and the initial angle of the back section is 40 to 65 degrees, then the knee lifting motor and the back lifting motor are actuated in a controlled manner so as to aim the angles thereof at the action change point δ (knee lifting angle 15 degrees, back lifting angle 65 degrees).

(5) If the initial angle of the knee section is 0 to 30 degrees, the initial angle of the back section is 40 to 78 degrees, and the angle of the back section is larger than that of the knee section according to the chosen preset action pattern, then the knee lifting motor and the back lifting motor are actuated in a controlled manner so as to aim the angles thereof at the action change point ϵ (knee lifting angle 0 degree, back lifting angle 78 degrees).

(6) If the initial angle of the knee section is 0 to 15 degrees, the initial angle of the back section is 65 to 78 degrees, and the angle of the back section is smaller than that required by the chosen preset action pattern, the computer program transmits commands via the controller so as to actuate the motors to aim the angles of the adjustable sections towards action change point ϵ (knee lifting angle 0 degree, back lifting angle 78 degrees).

As described above, if a back lifting operation command is issued, the back bottom section 1*a* or the knee bottom section 1*b* is adjusted from its present state so as to aim at any of the nearest action change points α to ϵ on the action pattern, to ensure that the back lifting action can be carried out according to the action pattern of (i) through (viii). Accordingly, the adjustment procedures, and the commands computed and issued by the computer software program of the present invention based on the initial positions of the adjustable sections and the angular movements of the sections called for by the present action pattern are simplified. Further, the position control map is simplified, by requiring that the angular positions of the adjustable sections are initially adjusted to the closest position on the corrective action curve, rather than adjusted to an arbitrary (such as flat) position before the adjustment procedure is carried out.

FIG. 9 and FIG. 10 show a correlative action curve which the back bottom section and the knee bottom section of the bed follow when they are lifted and lowered under coordinative operation. As described above, the control means (i . . . , the controller) controls the actuation of the drive means based on commands issued by the computer program of the present invention. In response to these commands, the drive means (motors), in communication with the back and knee sections of the bed, adjust the angular position of same so that they are initially adjusted to follow this correlative action curve.

For example, as can be seen from the graphs illustrated in FIGS. 9 and 10, the back bottom section of the bed is raised merely in one direction, and becomes gradually larger in angle. However, the knee bottom section is gradually raised in the beginning of the adjustment procedure, but then is lowered after passing a certain predetermined maximum angle. So, the angle of the knee bottom section is increased at the beginning of the procedure, but decreased in angle after a certain point in time. It was found by the present inventors that these actions decreased or eliminated the discomfort caused by exertion of pressure on the user usually experienced when conventional adjustment procedures are followed.

It should be noted that while the graphs shown in FIG. 9 and FIG. 10 are exemplary paths of adjustment provided by the present invention, the method of the present invention should not be limited thereto. For example, the angular adjustments of the back bottom section and the knee bottom section may deviate from the correlative action curve shown in FIG. 10. In a preferred embodiment, the present invention provides a flexible method of coordinatively controlling the movement of the adjustable sections of the bed from their currently existing positions (i.e., initial positions) deviating from the correlative action curve, to any correlative point on the correlative action curve. Importantly, the method and computer program of the present invention are operable to adjust the initial angular positions of the adjustable sections of a bed to an angular position closest to a position called for in a preset action pattern found by the present inventors to markedly decrease or eliminate discomfort to users during adjustment of the bed.

The coordinative control method for the back and knee bottom sections of a bed or the like of this invention has been described based on an action pattern for back lifting. However, in the case of gatch action, the present state of the bottom can be adapted to an action pattern for gatch action.

INDUSTRIAL APPLICABILITY

As described above, this method and computer program of the present invention provide the following unexpected effects:

(1) Irrespective of the present (initial) positions of bottom sections of an adjustable bed, they can be adjusted to desired positions.

(2) The back bottom section and the knee bottom section of an adjustable bed can be quickly brought to angular positions corresponding to a predetermined action pattern, and the bottom sections can be adjusted to desired positions according to the action pattern.

(3) Aiming of the back and knee bottom sections at the nearest action change point (angular position) of a preset action pattern significantly simplifies the adjustment process, thereby simplifying the position control map and corresponding procedures executed at the behest of the computer program commands.

What is claimed is:

1. A method for coordinative control of back and knee bottom sections of an adjustable bed during which the back and knee bottom sections are raised and/or lowered according to a preset action pattern, said preset action pattern comprising the steps of raising the knee bottom section to prevent a person in the bed from sliding toward a foot of the bed as the back bottom section is elevated, and then lowering the knee bottom section to prevent a person in the bed from feeling abdominal pressure as their legs approach their upper body, said raising and lowering of the knee bottom section occurring simultaneously with the elevation of the back bottom section, said method comprising the steps of:

(a) detecting present starting (initial) inclination angles of the back and knee bottom sections for identifying their present starting inclination angles;

(b) comparing identified present starting inclination angles of the back and knee bottom sections with the preset action pattern;

(c) calculating from step (b) above a position on the back bottom section and knee bottom section of the preset action pattern nearest to the detected present starting inclination angles of the back and knee bottom sections;

(d) raising and/or lowering the back and knee bottom sections to shift their starting inclination angles to predetermined inclination angles of nearest back and knee bottom section positions in the preset action pattern, for adapting a present coordinate position of the back and knee bottom sections in the preset action pattern; and then (e) raising and/or lowering the back and knee bottom sections according to said preset action pattern.

2. A method for coordinative control of back and knee bottom sections of a bed during which the back and knee bottom sections are raised and/or lowered according to a preset action pattern, said preset action pattern comprising the general steps of raising the knee bottom section to prevent a person in the bed from sliding toward a foot of the bed as the back bottom section is elevated, and then lowering the knee bottom section to prevent a person in the bed from feeling abdominal pressure as their legs approach their upper body, said raising and lowering of the knee bottom section occurring simultaneously with the elevation of the back bottom section, said method comprising the steps of:

(a) detecting present starting (initial) inclination angles of the back and knee bottom sections for identifying their present starting inclination angles;

(b) comparing identified present starting inclination angles of the back and knee bottom sections with the preset action pattern;

(c) calculating from step (b) above a position on the back bottom section of the preset action pattern nearest to the detected present starting inclination angles of the back bottom section;

(d) raising and/or lowering the knee bottom section from a starting inclination angle to an inclination angle corresponding to a nearest calculated position from step (c) above of the back bottom section in the preset action pattern; and then (e) raising and/or lowering the back and knee bottom sections to conform to said preset action pattern.

3. A method for coordinative control of back and knee bottom sections of a bed during which the back and knee bottom sections are raised and/or lowered according to a preset action pattern having action turning points, said preset action pattern comprising the general steps of raising the knee bottom section to prevent a person in the bed from sliding toward a foot of the bed as the back bottom section is elevated, and then lowering the knee bottom section to prevent a person in the bed from feeling abdominal pressure as their legs approach their upper body, said raising and lowering of the knee bottom section occurring simultaneously with the elevation of the back bottom section, said method comprising the steps of:

(a) detecting present (initial) starting inclination angles of the back and knee bottom sections for identifying their present starting inclination angles;

(b) comparing identified present (initial) starting inclination angles of the back and knee bottom sections with the preset action pattern;

(c) calculating from step (b) above a position of an action turning point of a back bottom section on a preset action pattern nearest to the detected present starting inclination angle of the knee bottom section;

(d) raising and/or lowering the back and knee bottom sections so that the identified present starting inclination angles of the back and knee bottom sections shift to the calculated nearest action turning point of a knee bottom section in the preset action pattern from step (c); and then (e) raising and/or lowering both the back and knee bottom sections according to said preset action pattern.

4. The method of claim 1, wherein, when a detected initial inclination angle of the knee bottom section is 0 to 15 degrees and a detected inclination angle of a back bottom section is 0 to 15 degrees, lifting of the knee bottom sections is begun first to conform to the preset action pattern.

5. The method of claim 1, wherein, when a detected initial inclination angle of the knee bottom section is 15 to 30 degrees and a detected initial inclination angle of the back bottom section is 0 to 15 degrees, and an inclination angle of the back bottom section is larger than a preset inclination angle of a knee bottom section in the preset action pattern, lifting of a knee bottom section is begun first to conform the present coordinate positions of the back and knee bottom sections to said preset action pattern.

6. The method of claim 1, wherein, when a detected initial inclination angle of a knee bottom section is 15 to 30 degrees and a detected initial inclination angle of a back bottom section is 0 to 15 degrees, and an inclination angle of the back bottom section is smaller than a preset inclination angle of a knee bottom section in a preset action pattern, lifting of a back bottom section is begun first for adapting a present coordinative position of the back and knee bottom sections to conform to said preset action pattern.

7. The method of claim 1, wherein, when a detected initial inclination angle of the knee bottom section is 0 to 30 degrees and a detected initial inclination angle of the back bottom section is 15 to 40 degrees, lifting of the knee bottom section is begun first for adapting a present coordinate position of the back and knee bottom sections to conform to said preset action pattern.

8. The method of claim 1, wherein, when a detected initial inclination angle of the knee bottom section is 0 to 15 degrees and a detected initial inclination angle of the back bottom section is 40 to 65 degrees; lifting of the back bottom section is begun first for adapting the present coordinate position of the back and knee bottom sections to conform to said preset action pattern.

9. The method of claim 1, wherein, when a detected initial inclination angle of the knee bottom section is 15 to 30 degrees and a detected initial inclination angle of the back bottom section is 40 to 55 degrees, and an inclination angle of the back bottom section is smaller than a preset inclination angle of the knee bottom section in a preset action pattern, lifting of the back bottom section is begun first for adapting a present coordinate position of the back and knee bottom sections to conform to said preset action pattern.

10. The method of claim 1, wherein, when a detected initial inclination angle of the knee bottom section is 15 to 30 degrees and the detected initial inclination angle of the back bottom section is 40 to 55 degrees, and the back lifting inclination angle is larger than a preset inclination angle of the knee bottom section in a preset action pattern, lowering of the knee bottom section is begun first for adjusting a present coordinative position of the back and knee bottom sections to conform to said preset action pattern.

11. The method of claim 1, wherein, when a detected initial inclination angle of the knee bottom section is 15 to 30 degrees and a detected initial inclination angle of the back bottom section is 55 to 78 degrees, lowering of the knee bottom section is begun first for adjusting a present coordinate position of the back and knee bottom sections to conform to said preset action pattern.

12. The method of claim 1, wherein, when a detected initial inclination angle of the knee bottom section is 0 to 20 degrees and the detected initial inclination angle of the back bottom section is 65 to 78 degrees, and an inclination angle of the back bottom section is larger than an inclination angle of the back bottom section in a preset action pattern, lifting of the back bottom section is begun first to adjust the present coordinate positions of the back and knee bottom sections to a preset action pattern.

13. The method of claim 1, wherein, when a detected initial inclination angle of a knee bottom section is 0 to 20 degrees and a detected initial inclination angle of a back bottom section is 65 to 78 degrees, and an inclination angle of the back bottom section is smaller than a preset inclination angle of a knee bottom section in the preset action pattern, lowering of the knee bottom section is begun first for adjusting the present position of a back and knee bottom section to conform to a preset action pattern.

14. The method of claim 2, further comprising storing a preset action-pattern in a controller.

15. The method of claim 2, wherein the preset action pattern corresponds to an action pattern as illustrated in FIG. 2.

16. The method of claim 14, wherein present starting (initial) inclination angles of adjustable bottom sections of the adjustable bed are compared in a controller with a stored preset action pattern as illustrated in FIG. 2.

17. The method of claim 3, wherein present inclination angles of the back and knee bottom sections is first detected by one or more rotation detection means (position detector).

18. The method of claim 17, wherein the starting (initial) inclination angles of the back and knee bottom sections of the adjustable bed obtained from the one or more position detectors are compared in a controller with a preset action pattern, to determine if starting positions of the back and knee bottom sections correspond to any point in the preset action pattern.

19. The method of claim 18, wherein the back and knee bottom sections of the adjustable bed are adjusted by a controller to correspond to a nearest action turning point of a knee bottom section in a preset action pattern.

20. The method of claim 3, wherein a preset action pattern corresponds to a pattern as illustrated in FIG. 8.

21. A computer program embodied on a computer readable medium for coordinatively controlling back and knee bottom sections of an adjustable bed during movement thereof according to a preset action pattern for lifting and lowering of the bed, so as to prevent a person lying in the bed from experiencing abdominal pressure as their legs approach their upper body during the movement, said computer program comprising computer executable instructions for implementing said preset action pattern comprising:

(a) detecting present starting (initial) inclination angles of the back and knee bottom sections of the adjustable bed, thereby identifying the present starting (initial) inclination angles thereof;

(b) comparing identified present starting (initial) inclination angles of the back and knee bottom sections with predetermined inclination angles required by the preset action pattern;

(c) calculating from step (b) above an angular position of the back bottom section and knee bottom section according to the preset action pattern nearest to the detected present starting (initial) inclination angles of the back and knee bottom sections;

(d) raising and/or lowering the back and knee bottom sections so as to adjust their starting (initial) inclination angles to predetermined inclination angles of nearest back and knee bottom section positions in the preset action pattern, for adapting a present coordinate position of the back and knee bottom sections to a starting coordinate position required by the preset action pattern; and then (e) raising and/or lowering the back and knee bottom sections according to said preset action pattern, wherein the preset action pattern comprises computer executable instructions for simultaneous raising and lowering of the knee bottom section and back bottom section to reach a final resting location.

22. A computer program embodied on a computer readable medium for coordinatively controlling back and knee bottom sections of an adjustable bed during movement thereof according to a preset action pattern for lifting and lowering of the bed, so as to prevent a person lying in the bed from experiencing abdominal pressure as their legs approach their upper body during the movement, said computer program comprising computer executable instructions for implementing said preset action pattern comprising:

(a) detecting present starting (initial) inclination angles of the back and knee bottom sections, so as to identify present starting (initial) inclination angles thereof;

(b) comparing identified present starting (initial) inclination angles of the back and knee bottom sections with predetermined inclination angles required by the preset action pattern;

(c) calculating from step (b) above an angular position of the knee bottom section of the preset action pattern nearest to the detected present starting (initial) inclination angle of the back bottom section;

(d) raising and/or lowering the knee bottom section from a starting (initial) inclination angle to an inclination angle corresponding to a nearest calculated position from step (c) above of the back bottom section in the preset action pattern; and then (e) raising and/or lowering the back and knee bottom sections to conform to said preset action pattern, so as to reach a final resting position.

23. A computer program embodied on a computer readable medium for coordinatively controlling back and knee bottom sections of an adjustable bed during movement thereof according to a preset action pattern, having action turning points for lifting and lowering of the bed, so as to prevent a person lying in the bed from experiencing abdominal pressure as their legs approach their upper body during the movement, said computer program comprising computer executable instructions for implementing said preset action pattern comprising:

(a) detecting present starting (initial) inclination angles of the back and knee bottom sections, so as to identify their present starting inclination angles;

(b) comparing the identified present starting (initial) inclination angles of the back and knee bottom sections with predetermined inclination angles required by the preset action pattern;

(c) calculating from step (b) above a position of an action turning point of a back bottom section on a preset action pattern nearest to the detected present starting (initial) inclination angle of the knee bottom section;

(d) raising and/or lowering the back and knee bottom sections so that the identified present starting (initial) inclination angles of the back and knee bottom sections are adjusted to the calculated nearest action turning point of a knee bottom section in the preset action pattern from step (c); and then (e) raising and/or lowering both the back and knee bottom sections according to said preset action pattern, so as to reach a final resting position.

* * * * *